F. D. Ward,
Riding Saddle.
Nº 2,584.    Patented Apr. 23, 1842.
Fig: 1.
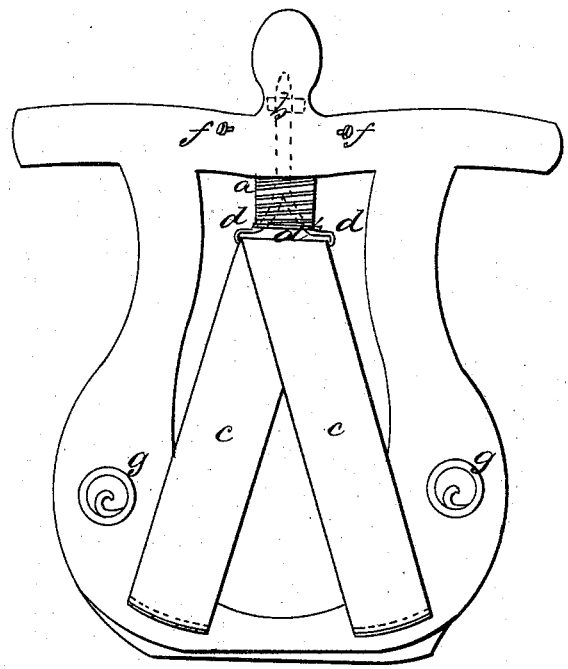
Fig: 2.
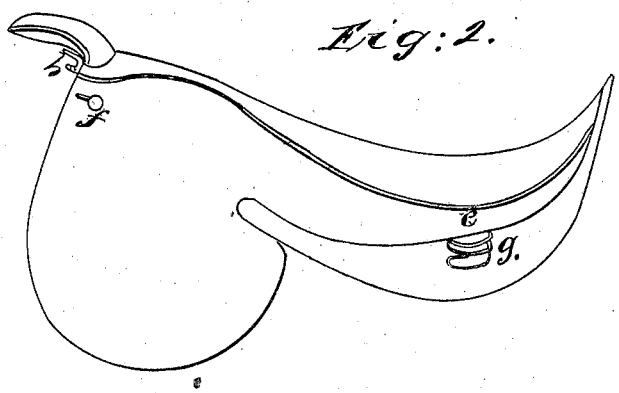

UNITED STATES PATENT OFFICE.

FOSTER D. WARD, OF BELLBROOK, OHIO.

IMPROVEMENT IN SADDLES.

Specification forming part of Letters Patent No. 2,584, dated April 23, 1842.

*To all whom it may concern:*

Be it known that I, FOSTER D. WARD, of Bellbrook, in the county of Greene and State of Ohio, have invented a new and Improved Spring-Seat Saddle; and I do hereby declare that the following is a full, clear, and exact description thereof, reference being had to the accompanying drawings, making a part of this specification, in which—

Figure 1 is a top view of the tree with jockey detached, showing the springs; Fig. 2, a side view of the saddle.

To the throat of a common saddle-tree I attach a spiral spring $a$ (which is somewhat flattened and curved to the shape of the throat) by means of a rod running through the spring and forward part of the tree. On the end of this rod a screw is cut, on which a nut $b$ is put that serves to tighten the spring. The webbing $c$ is attached to a loop $d$, which also passes through the spring and is attached to a cap-piece $d'$, which acts against the spring similar to many now in use, the webbing being nailed to the cantle in the usual way. Over this webbing and spring the jockey $e$ and the seat built thereon are put and nailed to the cantle, the rest of it being entirely unattached to the tree, except at the forward part, where there are two slits through which the buttons $f$ pass to hold it steady and at the same time allow it to play as the springs yield. Under the seat on each side near the cantle I place an upright spiral spring $g$, which rests on the saddle-bar. It will thus be seen that by the action of the springs $a$ and jockey $e$ and seat detached from the tree, together with the springs $g$ under the jockey, an equal and elastic seat is produced.

What I claim as my invention, and desire to secure by Letters Patent, is—

The combination of the forward spring $a$ and jockey $e$, detached from the forward part of the tree, with the spiral springs $g$ under the seat, in the manner and for the purpose above described.

FOSTER D. WARD.

Witnesses:
J. J. GREENOUGH,
B. K. MORSELL.